(12) United States Patent
Bertrand et al.

(10) Patent No.: US 8,218,496 B2
(45) Date of Patent: Jul. 10, 2012

(54) RANDOM ACCESS CYCLIC PREFIX DIMENSIONING IN WIRELESS NETWORKS

(75) Inventors: Pierre Bertrand, Antibes (FR);
Srinivasa Raghavan Sridhara, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 852 days.

(21) Appl. No.: 12/252,021

(22) Filed: Oct. 15, 2008

(65) Prior Publication Data

US 2009/0109919 A1 Apr. 30, 2009

Related U.S. Application Data

(60) Provisional application No. 60/982,902, filed on Oct. 26, 2007.

(51) Int. Cl.
*H04W 74/02* (2009.01)
*H04J 11/00* (2006.01)
*H04W 4/00* (2009.01)

(52) U.S. Cl. ........................................ 370/330; 370/329
(58) Field of Classification Search .................. 370/330, 370/329
See application file for complete search history.

(56) References Cited

U.S. PATENT DOCUMENTS

| 7,693,124 | B2* | 4/2010 | Subrahmanyam et al. ... | 370/343 |
|---|---|---|---|---|
| 2004/0081131 | A1* | 4/2004 | Walton et al. ................. | 370/344 |
| 2004/0082356 | A1* | 4/2004 | Walton et al. ................. | 455/522 |
| 2004/0132454 | A1* | 7/2004 | Trott et al. .................... | 455/447 |
| 2005/0084030 | A1* | 4/2005 | Zhou et al. .................... | 375/267 |
| 2005/0249174 | A1* | 11/2005 | Lundby et al. ................ | 370/338 |
| 2006/0203950 | A1* | 9/2006 | Chung et al. .................. | 375/376 |
| 2007/0230600 | A1* | 10/2007 | Bertrand et al. .............. | 375/260 |
| 2007/0291696 | A1* | 12/2007 | Zhang et al. .................. | 370/331 |
| 2008/0205433 | A1* | 8/2008 | Pihlaja et al. ................. | 370/461 |
| 2011/0149728 | A1* | 6/2011 | Lee ............................... | 370/230 |

FOREIGN PATENT DOCUMENTS

WO 2008115247 9/2008

OTHER PUBLICATIONS

Qualcomm Europe, Details of RACH sequence design, May 7-11, 2007, 3GPP TSG -RAN 1 #49 R1-072012, pp. 1-2.*
3GPP, Physical Channels and Modulation (Release 8), Nov. 2007, 3GPP TS 36.211 V8.1.0 (Nov. 2007), pp. 1-54.*
Motorola, Preamble Sequence Design for Random Access of E-UTRA, May 8-12, 2006, 3GPP TSG -RAN 1 #45 R1-061168, pp. 1-2.*

(Continued)

*Primary Examiner* — Kenny Lin
*Assistant Examiner* — Faisal Choudhury
(74) *Attorney, Agent, or Firm* — Ronald O. Neerings; Wade James Brady, III; Frederick J. Telecky, Jr.

(57) ABSTRACT

User equipment (UE)-initiated accesses within a cellular network include non-synchronized random access requests when the UE is not synchronized with a base station that is serving a cell occupied by the UE. The random access request is formed by generating a set of samples at a selected sample rate, such that the set of samples spans a specified duration period, wherein the sample rate is one of a plurality of different sample rates enabling different implementations of the random access transmission. The specified duration period is integrally divisible by each of the plurality of different sample periods.

19 Claims, 9 Drawing Sheets

OTHER PUBLICATIONS

Texas Instruments, "PRACH Cyclic Prefixes Adjustment", 3GPP TSG RAN WG1 #51bis, R1-080200, Agenda Item: 6.1.8, Sevilla, Spain, Jan. 14-18, 2008, pp. 1-3.

Qualcomm Europe, "Details on RACH Sequence Design", #GPP TSG RAN 1 #49, R1-072012, Agenda Item: 7.4, Kobe, Japan, May 7-11, 2007, pp. 1-2.

3GPP, "3rd Generation Partnership Project; Technical Specification Group Radio Access Network; Evolved Universal Terrestrial Radio Access (E-UTRA); Physical Channels and Modulation", (Release 8), V8.2.0, Valbonne, France, Mar. 2008, pp. 1-67.

3GPP, "3rd Generation Partnership Project; Technical Specification Group Radio Access Network; Evolved Universal Terrestrial Radio Access (E-UTRA); Physical Channels and Modulation", (Release 8), V8.1.0, Valbonne, France, Nov. 2007, pp. 1-55.

3GPP TS 36.211 V8.0.0; 3rd Generation Partnership Project; Technical Specification Group Radio Access Network; Evolved Universal Terrestrial Radio Access (E-UTRA); Physical channels and modulation; Release 8 ; Sep. 27, 2007 (http://www.3gpp.org/ftp/Specs/2007-09/Rel-8/36_series/36211-800.zip).

* cited by examiner es 2,218,496 B2

RANDOM ACCESS CYCLIC PREFIX DIMENSIONING IN WIRELESS NETWORKS

CROSS-REFERENCE TO RELATED APPLICATIONS

The present application claims priority to and incorporates by reference U.S. provisional application No. 60/982,902 filed on Oct. 26, 2007, entitled "Random Access Cyclic Prefix Dimensioning in Wireless Networks."

FIELD OF THE INVENTION

This invention generally relates to wireless cellular communication, and in particular to a non-synchronous random access channel for use in orthogonal and single carrier frequency division multiple access (OFDMA) (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Long Term Evolution (LTE) wireless networks, also known as Evolved Universal Terrestrial Radio Access Network (E-UTRAN), are being standardized by the 3GPP working groups (WG). OFDMA and SC-FDMA (single carrier FDMA) access schemes were chosen for the down-link (DL) and up-link (UL) of E-UTRAN, respectively. User Equipments (UE's) are time and frequency multiplexed on a physical uplink shared channel (PUSCH), and a fine time and frequency synchronization between UE's guarantees optimal intra-cell orthogonality. In case the UE is not UL synchronized, it uses a non-synchronized Physical Random Access Channel (PRACH), and the Base Station (also referred to as eNodeB) provides back some allocated UL resource and timing advance information to allow the UE transmitting on the PUSCH. The 3GPP RAN Working Group 1 (WG1) has agreed on the preamble based physical structure of the PRACH. RAN WG1 also agreed on the number of available preambles that can be used concurrently to minimize the collision probability between UEs accessing the PRACH in a contention-based manner. These preambles are multiplexed in CDM (code division multiplexing) and the sequences used are Constant Amplitude Zero Auto-Correlation (CAZAC) sequences. All preambles are generated by cyclic shifts of a number of root sequences, which are configurable on a cell-basis.

Depending on whether contention is involved or not, a RA procedure is classified into contention based and non-contention based (or contention-free). While the contention based procedure can be used by any accessing UE in need of uplink connection, the non-contention based is only applicable to handover and downlink data arrival events. In both procedures, a RA preamble is transmitted by the accessing UE to allow NodeB to estimate, and if needed, adjust the UE transmission time to within a cyclic prefix. It is agreed that there are 64 total RA preambles allocated for each cell of a NodeB, and each NodeB dynamically configures two disjoint sets of preambles to be used by the two RA procedures separately. The set for contention-based is broadcasted to all UEs by the NodeB, and the rest of the preambles in the other set are assigned by the NodeB one by one to the UEs in a contention-free procedure.

Zadoff-Chu (ZC) sequence has been selected as RA preambles for LTE networks. Specifically, a cell can use different cyclic shifted versions of the same ZC root sequence, or other ZC root sequences if needed, as RA preambles. Depending on whether a cell supports high-speed UEs (i.e., a high-speed cell) or not, sequence and cyclic shift allocation to a cell may differ.

The non-synchronized PRACH is multiplexed with scheduled data in a TDM/FDM manner. It is accessible during PRACH slots of duration $T_{RA}$ and period $T_{RA}$. The general operations of the physical random access channels are described in the specifications for evolved universal terrestrial radio access (EUTRA), for example: "$3^{rd}$ Generation Partnership Project; Technical Specification Group Radio Access Network; Evolved Universal Terrestrial Radio Access (E-UTRA); Physical Channels and Modulation (TS 36.211 v8.0.0, 2007-09).", as defined by the 3GPP working groups (WG). The EUTRA is sometimes also referred to as 3GPP long-term evolution (3GPP LTE).

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
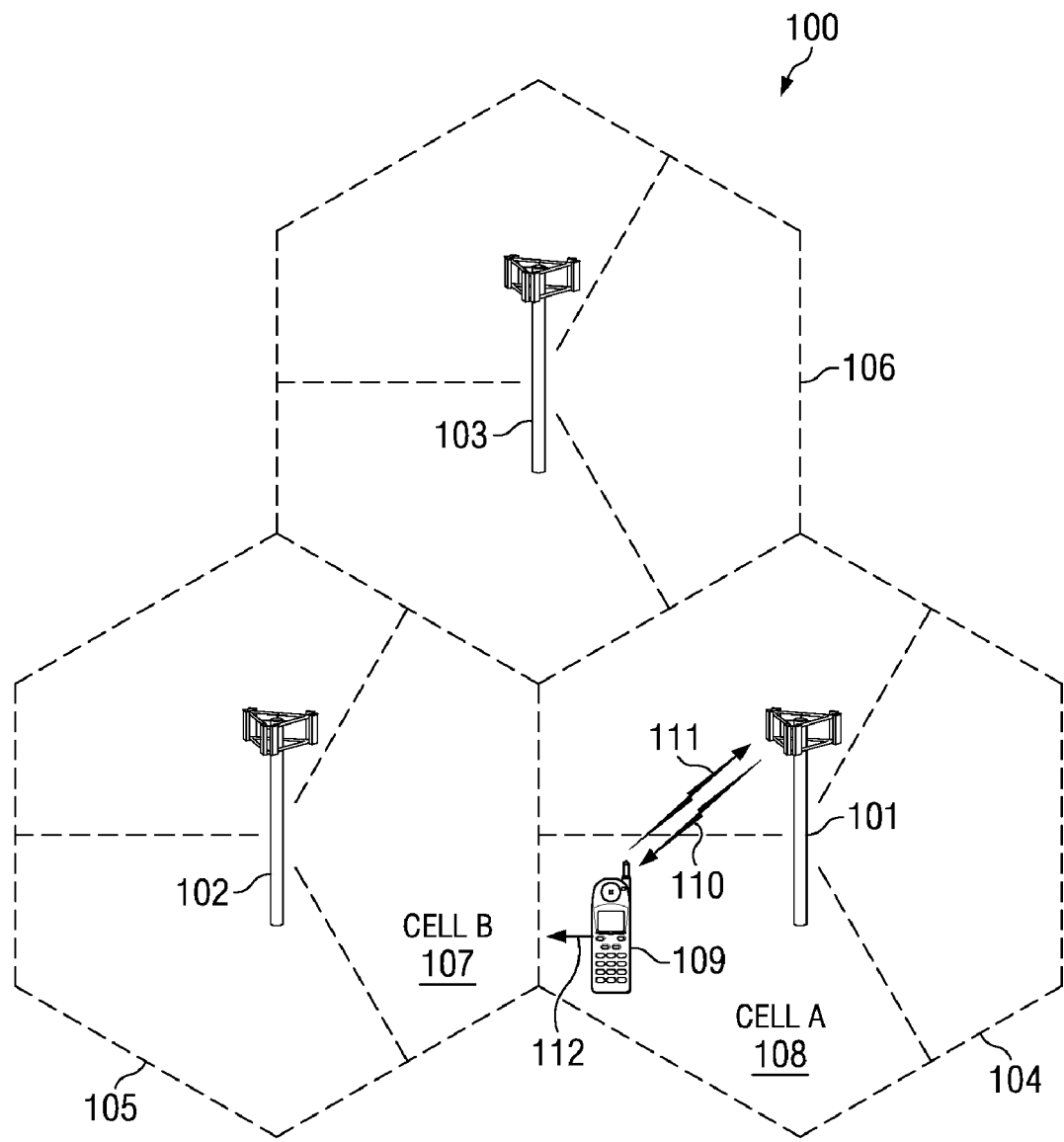
FIG. 1 is a pictorial of an illustrative telecommunications network that supports transmission of multiplexed RA preambles having a selected CP duration.

Disclosed herein are various systems and methods for employing a random access channel in a wireless network to accommodate user equipment operating in cells of varying sizes. Embodiments of the disclosed invention may be used to access a wireless network, such as a telecommunications system, employing random access techniques. A variety of wireless networks employ random access techniques, for example the Enhanced Universal Terrestrial Radio Access Network (E-UTRAN), currently being standardized by the 3GPP working groups. The disclosed embodiments of the invention are applicable to all such networks. The disclosed embodiments include apparatus for transmitting random access signals with selected cyclic prefix durations and a method for transmitting a random access signal optimized for cellular coverage.

Embodiments of the present disclosure are directed, in general, to wireless communication systems, and can be applied to generate random access transmissions. Random access transmissions may also be referred to as ranging transmissions, or other analogous terms.

User Equipment ("UE") may be either up-link ("UL") synchronized or UL non-synchronized. That is, UE transmit timing may or may not be adjusted to align UE transmissions with NodeB transmission time slots. When the UE UL has not been time synchronized, or has lost time synchronization, the UE can perform a non-synchronized random access to request allocation of up-link resources. Additionally, a UE can perform non-synchronized random access to register itself at the access point, or for numerous other reasons. Possible uses of random access transmission are many, and do not restrict the scope of the present disclosure. For example, the non-synchronized random access allows the NodeB to estimate, and if necessary, to adjust the UE's transmission timing, as well as to allocate resources for the UE's subsequent up-link transmission. Resource requests from UL non-synchronized UEs may occur for a variety of reasons, for example: new network access, data ready to transmit, or handover procedures.

In 3GPP TS 36.211 v8.0.0, 2007-09, "Technical Specification Group Radio Access Network; Evolved Universal Terrestrial Radio Access (E-UTRA); Physical channels and modulation (Release 8)," four Random Access (RA) burst formats are defined. Each format is defined by the durations of both the preamble and its cyclic prefix (CP). Table 1 provides these parameters, as they were originally defined, in version 8.1.0 of the above document. For frame structure type 2 (FS2) dedicated to TDD, no cyclic prefix is foreseen, therefore this disclosure will focus on the frame structure type 1 (FS1), addressing both FDD and TDD systems.

TABLE 1

Random access burst parameters (TS 36.211 v8.1.0 2007-11).

| Frame structure | Burst format | $T_{CP}$ | $T_{PRE}$ |
|---|---|---|---|
| Type 1 | 0 | $3152 \times T_s$ | $24576 \times T_s$ |
|  | 1 | $21012 \times T_s$ | $24576 \times T_s$ |
|  | 2 | $6224 \times T_s$ | $2 \times 24576 \times T_s$ |
|  | 3 | $21012 \times T_s$ | $2 \times 24576 \times T_s$ |
| Type 2 | 0 | $0 \times T_s$ | $4096 \times T_s$ |
|  | 1 | $0 \times T_s$ | $16384 \times T_s$ |
|  | 2 |  |  |

For FS1, the various burst formats address the following requirements:

Format 0: baseline 1 ms RA burst with 800 μs preamble, for small-medium cells (up to ~14 km).

Format 1: 2 ms RA burst with 800 μs preamble, for large cells (up to ~77 km) without link budget issue Format 2: 2 ms RA burst with 1600 μs preamble, for medium cells (up to ~28 km) supporting low data rates Format 3: 3 ms RA burst with 1600 μs preamble, for very large cells (up to ~100 km)

Two different rules were used to design the CP depending on the format:

Format 0&2: the cyclic prefix is dimensioned to maximize the coverage, given a maximum delay spread d: $T_{CP}=(1$ ms−800 μs)/2+d/2, with d≈5.2 μs and 16.67 μs for format 0 and 2 respectively.

Format 1&3: the cyclic prefix is dimensioned to address the maximum cell range in LTE, 100 km, with a maximum delay spread of d≈16.67 μs The CP durations are captured in the specification in integer number of the smaller system sampling period defined for LTE: $T_S=1/30.72$ μs. Without changing the above design rules, some adjustments on these $t_{CP}$ values in order to facilitate the CP implementation are described herein.

FIG. 1 shows an illustrative wireless telecommunications network 100 that supports transmission of multiplexed RA preambles having a selected CP duration, as described in more detail below. The illustrative telecommunications network includes base stations 101, 102, and 103, though in operation, a telecommunications network may include more base stations or fewer base stations. Each of base stations 101, 102, and 103 is operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be "handed over" to base station 102. Assuming that UE 109 is synchronized with base station 101, UE 109 likely employs non-synchronized random access to initiate handover to base station 102. The distance over which a random access signal is recognizable by base station 101 is a factor in determining cell size.

When UE 109 is not up-link synchronized with base station 101, non-synchronized UE 109 employs non-synchronous random access (NSRA) to request allocation of up-link 111 time or frequency or code resources. If UE 109 has data ready for transmission, for example, traffic data, measurements report, tracking area update, etc., UE 109 can transmit a random access signal on up-link 111 to base station 101. The random access signal notifies base station 101 that UE 109 requires up-link resources to transmit the UE's data. Base station 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by base station 101, UE 109 may adjust its transmit timing, to bring the UE 109 into synchronization with base station 101, and transmit the data on up-link 111 employing the allotted resources during the prescribed time interval.

UE 109 is traveling in a direction with a ground speed as indicated by 112. The direction and ground speed results in a speed component that is relative to serving NodeB 101. Due to this relative speed of UE moving toward or away from its serving NodeB a Doppler shift occurs in the signals being transmitted from the UE to the NodeB resulting in a frequency shift and/or frequency spread that is speed dependent.

Figure 2:
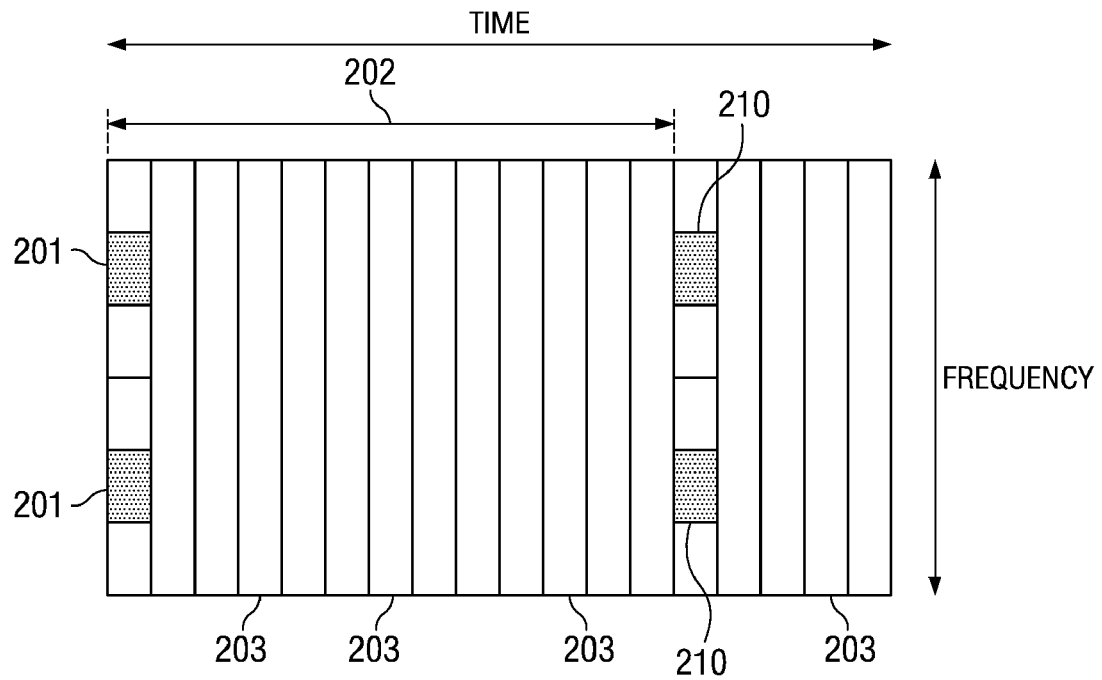
FIG. 2 is an illustrative up-link time/frequency allocation for use in the network of FIG. 1.

FIG. 2 illustrates an exemplary up-link transmission frame 202, and the allocation of the frame to scheduled and random access channels. The illustrative up-link transmission frame 202, comprises a plurality of transmission sub-frames. Sub-frames 203 are reserved for scheduled UE up-link transmissions. Interspersed among scheduled sub-frames 203, are time and frequency resources allocated to random access channels 201, 210. In the illustration of FIG. 2, a single sub-frame supports two random access channels. Note that the illustrated number and spacing of random access channels is purely a matter of convenience; a particular transmission frame implementation may allocate more or less resource to random access channels. Including multiple random access channels allows more UEs to simultaneously transmit a random access signal without collision. However, because each UE independently chooses the random access channel on which it transmits, collisions between UE random access signals may occur.

Figure 3:
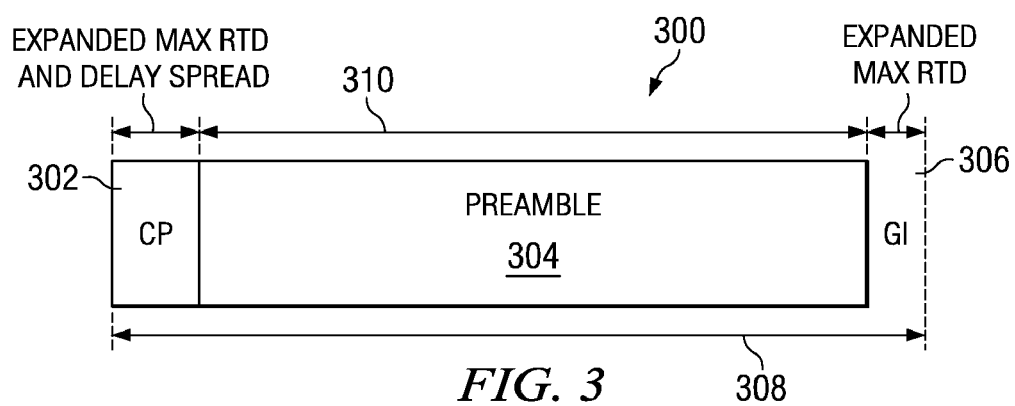
FIG. 3 illustrates a non-synchronized physical random access channel (PRACH) preamble structure in time domain for use in the uplink transmission of FIG. 2.

FIG. 3 illustrates an embodiment of a random access signal 300. The illustrated embodiment comprises cyclic prefix 302, random access preamble 304, and guard interval 306. Random access signal 300 is one transmission time interval 308 in duration. Transmission time interval 308 may comprise one or more sub-frame 203 durations. Note that the time allowed for random access signal transmission may vary, and this variable transmission time may be referred to as transmitting over a varying number of transmission time intervals, or as transmitting during a transmission time interval that varies in duration. This disclosure applies the term "transmission time interval" to refer to the time allocated for random access signal transmission of any selected duration, and it is understood that this use of the term is equivalent to uses referring to transmission over multiple transmission time intervals. The time period allotted for random access signal transmission may also be referred to as a random access time slot.

Cyclic prefix 302 and guard interval 306 are typically of unequal duration. Guard interval 306 has duration equal to approximately the maximum round trip delay of the cell while cyclic prefix 302 has duration equal to approximately the sum of the maximum round trip delay of the cell and the maximum delay spread. As indicated, cyclic prefix and guard interval durations may vary from the ideal values of maximum round trip delay and maximum delay spread while effectively optimizing the random access signal to maximize coverage. All such equivalents are intended to be within the scope of the present disclosure.

Round trip delay is a function of cell size, where cell size is defined as the maximum distance d at which a UE can interact with the cell's base station. Round trip delay can be approximated using the formula $t=d*20/3$ where t and d are expressed in microseconds and kilometers respectively. The round-trip delay is the two-way radio propagation delay in free space, which can be approximated by the delay of the earlier radio path. A typical earlier path is the line-of-sight path, defined as the direct (straight-line) radio path between the UE and the base station. When the UE is surrounded by reflectors, its radiated emission is reflected by these obstacles, creating multiple, longer traveling radio paths. Consequently, multiple time-delayed copies of the UE transmission arrive at the base station. The time period over which these copies are delayed is referred to as "delay spread," and for example, in some cases, 5 μs may be considered a conservative value thereof.

Cyclic prefix 302 serves to absorb multi-path signal energy resulting from reflections of a signal transmitted in the prior sub-frame, and to simplify and optimize equalization at the NodeB 101 receiver by reducing the effect of the channel transfer function from a linear (or aperiodic) correlation to a cyclic (or periodic) correlation operated across the observation interval 310. Guard interval 306 follows random access preamble 304 to prevent interference between random access preamble signal 304 and any transmission in the subsequent sub-frame on the same transmission frequencies used by random access preamble signal 304.

Random access preamble signal 304 is designed to maximize the probability of preamble detection by the NodeB and to minimize the probability of false preamble detections by the NodeB, while maximizing the total number of resource opportunities. Embodiments of the present disclosure utilize constant amplitude zero autocorrelation ("CAZAC") sequences to generate the random access preamble signal. CAZAC sequences are complex-valued sequences with the following two properties: 1) constant amplitude (CA), and 2) zero cyclic autocorrelation (ZAC).

Figure 4:
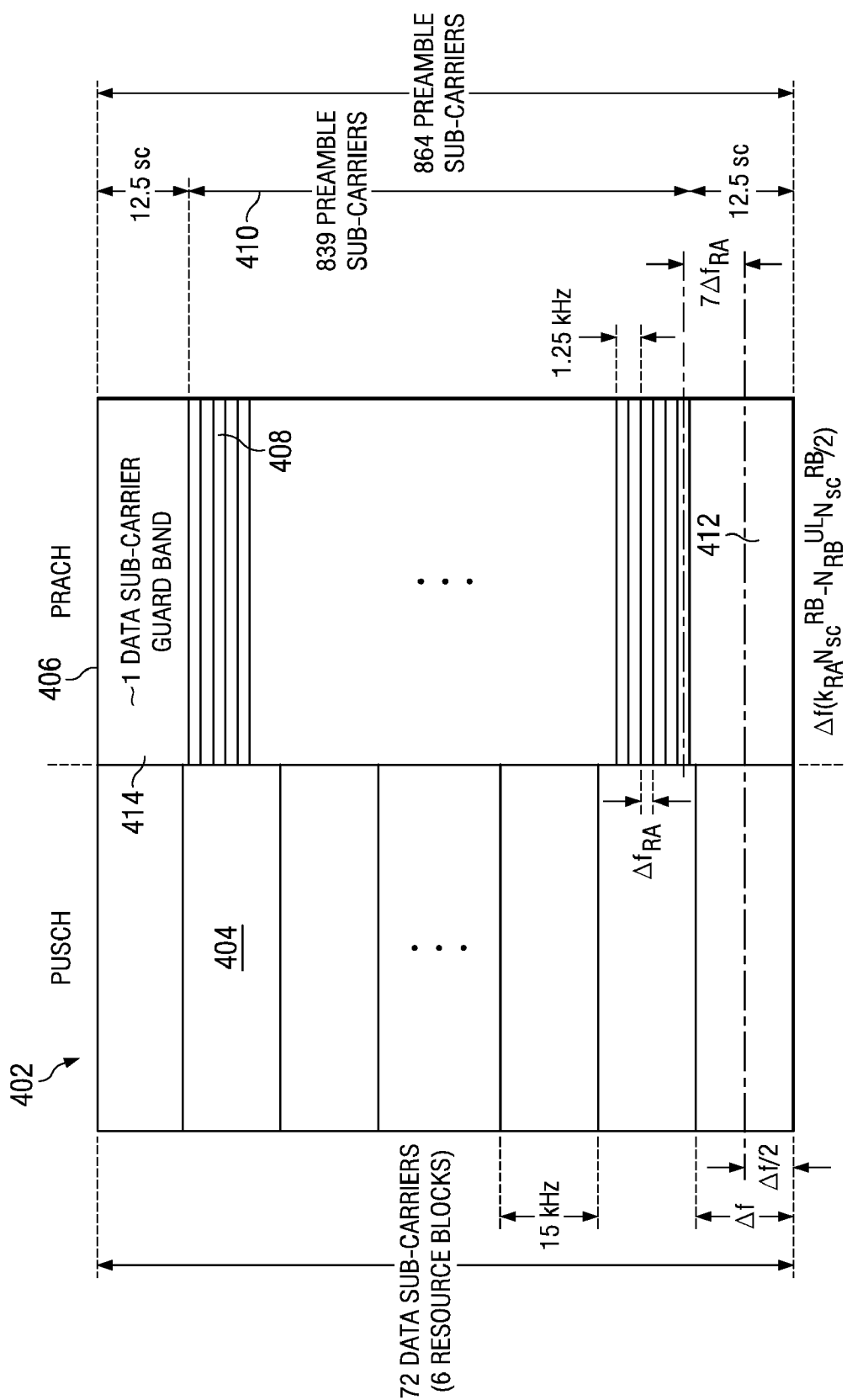
FIG. 4 is an illustration of the PRACH preamble structure in frequency domain for use in the uplink transmission of FIG. 2.

FIG. 4 is a more detailed illustration of the PRACH preamble structure for use in the uplink transmission of FIG. 2. FIG. 4 illustrates the preamble structure in frequency domain, while FIG. 3 illustrated the preamble structure in time domain. Physical uplink shared channel (PUSCH) structure 402 illustrates the seventy-two sub-carriers 404 that are each 15 kHz when the frequency resources are allocated to PUSCH, while physical random access channel (PRACH) preamble structure 406 illustrates the 864 sub-carriers 408 that are each 1.25 kHz when the frequency resources are allocated to PRACH. This embodiment uses guard bands 412, 414 to avoid the data interference at preamble edges.

The preamble sequence is a long CAZAC complex sequence allocated to the UE among a set of $R_S$ possible sequences. These sequences are built from cyclic shifts of a CAZAC root sequence. If additional sequences are needed, they are built from cyclic shifts of other CAZAC root sequences.

Well known examples of CAZAC sequences include, but are not limited to: Chu Sequences, Frank-Zadoff Sequences, Zadoff-Chu (ZC) Sequences, and Generalized Chirp-Like (GCL) Sequences. A known set of sequences with CAZAC property is the Zadoff-Chu N-length sequences defined as follows $$a_k = \exp\left[-j2\pi \frac{M}{N}\left(\frac{k(k+1)}{2} + qk\right)\right]$$

where M is relatively prime to N, N odd, and q any integer. The M is the generating index of ZC sequence, which can also be referred to as physical root sequence index, physical root sequence number, and others, in various embodiments. Each root ZC sequence has a unique generating index.

The latter constraint on N also guarantees the lowest and constant-magnitude cross-correlation $\sqrt{N}$ between N-length sequences with different values of M: $M_1$, $M_2$ such that ($M_1 - M_2$) is relatively prime to N. As a result, choosing N a prime number always guarantees this property for all values of M<N, and therefore maximizes the set of additional sequences, non orthogonal, but with optimal cross-correlation property. On top of providing additional sequences for a UE to chose among in a given cell, these sequences are also intended to be used in neighboring cells, so as to provide good inter-cell interference mitigation. In this disclosure, the terms: Zadoff-Chu, ZC, and ZC CAZAC, are used interchangeably. The term CAZAC denotes any CAZAC sequence, ZC or otherwise.

In various embodiments of the present disclosure, random access preamble signal 304 comprises a CAZAC sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and others. Thus, in one embodiment of the present disclosure, a UE constructs random access preamble signal 304 by selecting a CAZAC sequence, possibly applying a combination of the described modifications to the selected CAZAC sequence, modulating the modified sequence, and transmitting the resulting random access signal over the air.

The time-continuous PRACH preamble signal s(t) is defined by (from 3GPP TS 36.211 v8.1.0 (2007-11), Technical Specification Group Radio Access Network; Physical Channels and Modulation (Release 8)):

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+\frac{1}{2}))\Delta f_{RA}(t-T_{CP})}$$

where $$0 \leq t < T_{SEQ} + T_{CP},$$

$\beta_{PRACH}$ is an amplitude scaling factor and $$k_0 = n_{PRB}^{RA} N_{sc}^{RB} - N_{RB}^{UL} N_{sc}^{RB}/2.$$

$T_{SEQ}$ is the sequence duration and $T_{CP}$ is the cyclic prefix duration. $N_{sc}^{RB}$ is the number of data subcarriers per resource block (RB) and $N_{RB}^{UL}$ is the total number of resource blocks available for UL transmission. The location in the frequency domain is controlled by the parameter $n_{PRB}^{RA}$, expressed as a resource block number configured by higher layers and fulfilling $$0 \leq n_{PRB}^{RA} \leq N_{RB}^{UL} - 6.$$

The factor $$K = \Delta f/\Delta f_{RA}$$

accounts for the difference in subcarrier spacing between the random access preamble and uplink data transmission. The variable φ defines a fixed offset determining the frequency-domain location of the random access preamble within the resource blocks. The PRACH signal takes the following value for φ: φ=7.

The above numerical example applies to preamble burst formats 0 to 3. Same design principle is also applicable to burst format 4 with different numerical values.

The E-UTRA PRACH preamble is a Cyclically Shifted Zadoff-Chu (CS-ZC) sequence, as described in 3GPP TS 36.211 v8.1.0 (2007-11), Technical Specification Group Radio Access Network; Physical Channels and Modulation (Release 8). The construction of these sequences uses the Constant Amplitude Zero Auto-Correlation (CAZAC) property of the Zadoff-Chu (ZC) sequences by cyclically shifting a ZC root sequence by an amount guaranteed to maintain the orthogonality of the resultant sequences. For example, a ZC root sequence may be shifted by an integer multiple of the cell's maximum round trip delay plus the delay spread, to generate a set of orthogonal sequences. Additional preamble sequences may be generated by cyclically shifting other ZC root sequences. As a result, the cyclic shift and corresponding number of root sequences used in a cell are a function of the cell size. Generally, only one ZC root sequence index is signaled (implicitly or explicitly) to the UE, regardless the actual number of root sequences required in a cell. The UE can derive the subsequent root sequence indexes according to a pre-defined ordering. Before looking at the possible choices for this ZC ordering, we first list the various aspects that influence this design.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term. In other places, the CAZAC-like sequence is generally referred to as the second sequence.

Cyclic Shift Configurations

In the present embodiment, a sequence length of 839 is assumed which means that ten bits are required to signal one Zadoff-Chu generating index. Given that up to 64 sequences may need to be signaled, it is highly desirable to minimize the associated overhead due to signaling multiple sequences. This is achieved by signaling only one logical index and the UE derives the subsequent indexes according to a pre-defined ordering. Each ZC sequence has a unique logical index. The ordering of sequences is identified by the logical indexes of the sequences, with each logical index uniquely mapped to a generating index. Note that in one embodiment, the ordering of sequences is the same as the ordering of their generating indexes. From the above considerations, cyclic shift and ZC generating indexes are configured on a cell basis. The cyclic shift value (or increment) is taken from among sixteen pre-defined values.

Random Access Preamble Signaling

As described above, the minimum Random Access preamble parameters that need be signaled are 19 bits:
Cyclic shift configuration (4 bits)
Unrestricted cyclic shift set or restricted cyclic shift set (1 bit)
$1^{st}$ ZC logical index (10 bits)
PRACH timing configuration (4 bits)

The signaling of cyclic shift configuration the cyclic shift set type (unrestricted or restricted) is to determine the value of cyclic shift to use. In various embodiments of signaling method, either one or two auxiliary parameters can be used to signal a cyclic shift value to use.

A 1-bit flag signals whether the current cell is a high speed cell or not. For high speed cells, cyclic shift restrictions apply and the UE identifies which cyclic shifts must not be used. The excellent auto/cross-correlation of CS-ZC sequences allows supporting a much larger number of signature opportunities, 64, than the 16 Walsh-Hadamard opportunities offered in the current UMTS RACH preamble, and this with very little performance loss. However, the above performance assumes no or little Doppler spread or frequency shift, in presence of which, the CS-ZC sequence looses its zero-auto-correlation property. Indeed, high Doppler shifts induce correlation peaks in the receiver's bank of correlators offset by $d_u$ from the desired peak when the u-th root sequence of length $N_{ZC}$ is transmitted. The cyclic offset $d_u$ depends on the generating index u, which can be derived from (1), or a mathematically equivalent expression, as $$d_u = \begin{cases} u^{-1} \bmod N_{ZC} & 0 \le u^{-1} \bmod N_{ZC} < N_{ZC}/2 \\ N_{ZC} - u^{-1} \bmod N_{ZC} & \text{otherwise} \end{cases} \quad (1)$$

Where $u^{-1} \bmod N_{ZC}$ is the modulo inverse of $d_u$, in the sense of $$d_u \cdot u = 1 \bmod N_{ZC} \quad (2)$$

A solution to this problem of loss of zero-auto-correlation property is "masking" cyclic shift positions where side peaks are expected in the ZC root sequence. Therefore, for high speed cells where cyclic shift restrictions apply, more ZC root sequences will need to be configured compared to low-medium speed cells. Another impact of the side peaks is that they restrict the possible cyclic shift range so as to prevent from side peaks to occur within the used cyclic shift region.

It results that, in the case where the ZC sequences are not ordered by increasing maximum supportable high-speed cell size, there will be cases where, in a high-speed cell, some of the ZC sequences following the $1^{st}$ sequence signaled by the NodeB are not compliant with the cell radius of that cell. In which cases, these sequences are skipped.

To reduce NodeB signaling, in one embodiment, a single logical index is broadcasted to all UEs in a cell as the starting root sequence allocated to this cell for contention-based random access. In addition to that, the number of signatures for contention-based RA is also given, so that with debased ordering, an accessing UE can derive from the ordering table the available root sequences, hence the usable signatures, given the usable cyclic shifts for each root sequence. Since a subset of signatures may be reserved for contention-free RA, in one embodiment NodeB can reserve the signatures with the lowest cubic metrics for contention-free RA, so that a UE uses the remaining subset of signatures of high cubic metrics for contention-based RA.

Cyclic Prefix Insertion: Implementation Options

One of two design choices are commonly used for CP insertion at the UE: at the system sampling rate or at a lower sampling rate. The cyclic prefix is formed by taking a portion of the preamble sequence that has a defined duration equal to approximately the sum of the maximum round trip delay of the cell and the maximum delay spread. The CP durations are captured in the 3GPP specification as integer multiples $N_{CP}$ of $T_S$, where $T_S=(1/30.72)$ μs.

Figure 5:
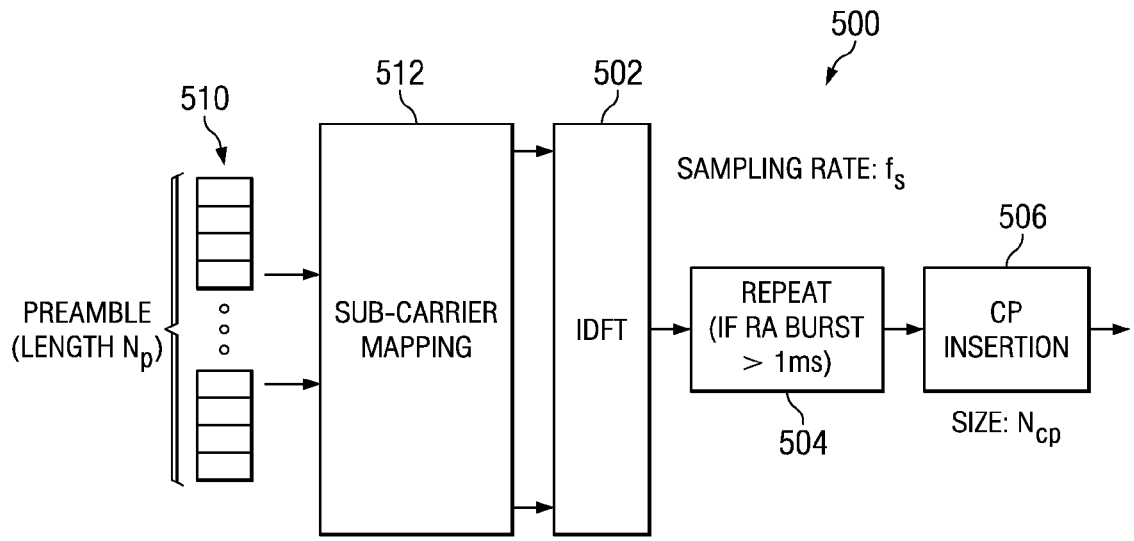
FIG. 5 is a block diagram of an illustrative transmitter for transmitting the preamble structure of FIG. 3 using the system sampling rate to implement the cyclic prefix field.
Figure 6:
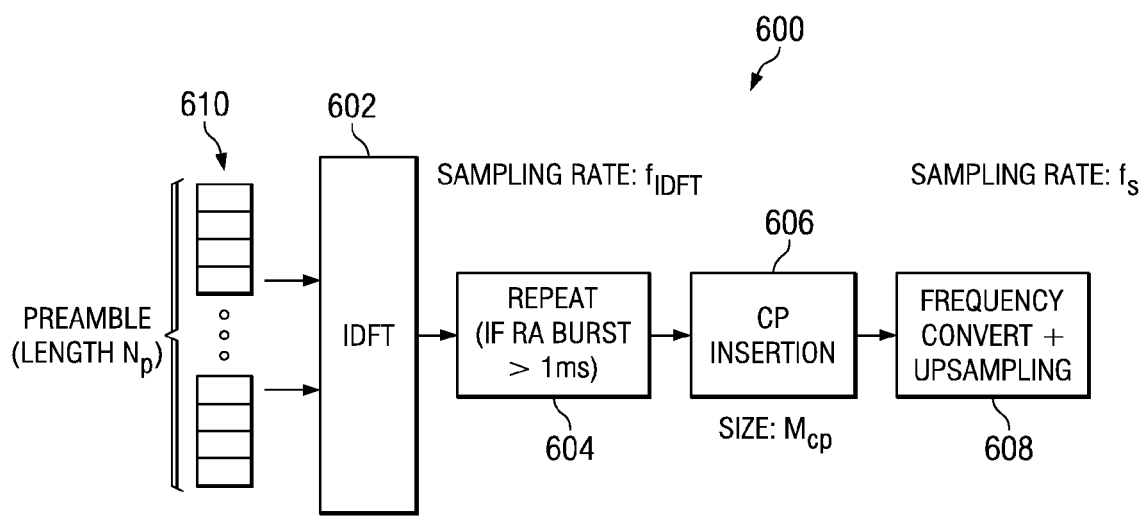
FIG. 6 is a block diagram of an illustrative transmitter for transmitting the preamble structure of FIG. 3 using a lower IDFT sampling rate to implement the cyclic prefix field.

FIG. 5 is a block diagram of an illustrative transmitter 500 for transmitting the preamble structure of FIG. 3 using the system sampling rate to implement the cyclic prefix field. Cyclic prefix insertion is implemented at the system sampling rate typically when the PRACH burst is generated by means of a large IDFT 502 as illustrated in FIG. 6. This method is referred to as full frequency domain preamble generation. For all possible system sampling rates, the CP duration should correspond to an integer number of samples in order to avoid any interpolation block or any other mechanism to cope with non-integer number of samples. In RAN WG4, six system bandwidths were defined as listed in Table 2. They are all multiple of the smaller system sampling rate, 1.92 Msps=30.72/16 Msps. Given the CP durations are captured in the specification in integer multiple $N_{CP}$ of $T_S=1/30.72$ μs, it results that the minimum requirement for $N_{CP}$ is that $N_{CP}$ should be divisible by 16. This is already the case for the CP durations of burst formats 0 and 2, but it is not the case of the CP durations of burst formats 1 and 3, which should be updated accordingly. For example, a value for $N_{CP}$ may be selected to equal 21008 or 21024. In this embodiment, the preamble burst is repeated by repeat logic 504 if the RA burst is greater than 1 ms, for example, for formats 2 and 3. The CP is then formed using the system sampling rate and appended in the preamble burst in CP logic 506.

TABLE 2

LTE System sampling rates

| Spectrum allocation (MHz) | System sampling rate (MHz) | PUSCH FFT size | # of occupied subcarriers | # of occupied RBs |
|---|---|---|---|---|
| 1.4 | 1.92 | 128 | 75 | 6 |
| 3 | 3.84 | 256 | 180 | 15 |
| 5 | 7.68 | 512 | 300 | 25 |
| 10 | 15.36 | 1024 | 600 | 50 |
| 15 | 23.04 | 1536 | 900 | 75 |
| 20 | 30.72 | 2048 | 1200 | 100 |

Elements of transmitter 500 may be implemented as components in a fixed or programmable processor. In some embodiments, the IDFT block in 502 may be implemented using an Inverse Fast Fourier Transform (IFFT). As was described in more detail above, a pre-defined set of sequences is defined. An ordered group of sequences that is a proper subset of the pre-defined set of sequences is used within a particular cell. Upon entering the cell, a UE receives an indication of a logical index for a first sequence, wherein the first sequence belongs to the ordered group of sequences and an indication of an auxiliary parameter that further describes the amount of cyclic shift to use. The UE performs selection of the CAZAC (e.g. ZC) root sequence using a ZC root sequence selector module and the selection of the cyclic shift value using cyclic shift selector module, not shown. The sequence is selected from the ordered group of sequences using the received indication of the logical index of the first sequence and using the auxiliary parameter, as was described in more detail above.

Next, the UE generates the ZC sequence using a ZC root sequence generator, not shown, using the generation index of the selected sequence. Then, if necessary, the UE performs cyclic shifting of the selected ZC sequence using a Cyclic Shifter, not shown, to form a preamble sequence 510. The preamble sequence is mapped onto a designated set of tones (sub-carriers) using Tone Map 512. Additional signals or zero-padding may or may not be present. The UE next performs IDFT of the mapped signal using the IDFT 502. The CP is then formed as described above.

In other embodiments, the order of the cyclic shifter, tone map 512 and IDFT 502 may be arranged in various combinations. For example, in one embodiment a DFT operation is performed on a selected root sequence, tone mapping is then performed, an IDFT is performed on the mapped tones and then the cyclic shift may be performed. In another embodiment, tone mapping is performed on the root sequence and then an IDFT is performed on the mapped tones and then a cyclic shift is performed.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term. In other places, the CAZAC-like sequence is generally referred to as the second sequence.

It should be noted that, even though the UE implementation may be different, this rule also holds true for the eNB PRACH receiver, where the CP removal at system sampling rate is what makes most sense. In an embodiment in which the CP duration period $N_{CP}$ is not integrally divisible by the system sample rate, there is a need to upsample to a data rate where the fractional sample period at the system sample rate corresponds to an integer number of samples and then add as many zero-valued samples as required. Similarly, on the eNB side, there is a need to obtain samples at the same higher sampling rate in order to remove these additional zero samples and, then, down sample to the system sampling rate for further processing. The improved CP durations disclosed herein eliminates this additional complexity on both UE and eNB.

FIG. 6 is a block diagram of an illustrative transmitter 600 for transmitting the preamble structure of FIG. 3 using a lower IDFT sampling rate to implement the cyclic prefix field. Another option for building the preamble uses a smaller IDFT 602 and up-samples 604 to the system bandwidth and frequency-converts 604 to the required center frequency in time domain. This method is referred to as hybrid frequency/time domain generation. Given the preamble sequence length is 839, the first IDFT size that can be used is 1024, resulting in a sampling frequency $f_{IDFT}$=1.28 Msps. Applying the same reasoning as described with respect to an embodiment of FIG. 5 based on the system sampling rate yields the requirement that $N_{CP}$ should be divisible by 24 to let CP duration be an integer number of $f_{IDFT}$ samples. Note that higher IDFT sizes are possible, e.g. 1536, which results in 1.92 Msps and therefore is already covered by a sampling rate divisible by 16. In this embodiment, the preamble burst is repeated by repeat logic 604 if the RA burst is greater than 1 ms, for example, for formats 2 and 3. The CP is then formed using the IDFT sampling rate and inserted in the preamble burst in CP logic 606.

Elements of transmitter 600 may be implemented as components in a fixed or programmable processor. In some embodiments, the IDFT block in 602 may be implemented using an Inverse Fast Fourier Transform (IFFT). As was described in more detail above, a pre-defined set of sequences is defined. An ordered group of sequences that is a proper subset of the pre-defined set of sequences is used within a particular cell. Upon entering the cell, a UE receives an indication of a logical index for a first sequence, wherein the first sequence belongs to the ordered group of sequences and an indication of an auxiliary parameter that further describes the amount of cyclic shift to use. The UE performs selection of the CAZAC (e.g. ZC) root sequence using a ZC root sequence selector module and the selection of the cyclic shift value using cyclic shift selector module, not shown. The sequence is selected from the ordered group of sequences using the received indication of the logical index of the first sequence and using the auxiliary parameter, as was described in more detail above.

Next, the UE generates the ZC sequence using a ZC root sequence generator, not shown, using the generation index of the selected sequence. Then, if necessary, the UE performs cyclic shifting of the selected ZC sequence using a Cyclic Shifter, not shown, to form a preamble sequence 610. The UE next performs IDFT of the preamble sequence using IDFT 602. The CP is then formed as described above.

In an IDFT-based implementation, all advantageous sampling rates will be multiples of subcarrier spacing (=1.25 kHz). Further, efficient implementations will employ a power-of-2 IFFT or a power-of-2 multiplied by 3 IFFT. Since, the RACH sequence length is 839, a minimum IFFT size is 1024. Therefore, useful sampling rates are 1.28 Msps (1024), 1.92 Msps (1536), 2.56 Msps (2048), and so on. These are all covered by the CP durations described herein.

Cyclic Prefix Design

As can be seen from the above descriptions, in order to allow designers choosing among various CP implementation options while avoiding the need for any interpolation block or any other mechanism to cope with CP durations defined as non-integer number of samples, $N_{CP}$ should be divisible by both 16 and 24, i.e. $N_{CP}$ should be divisible by 48, which is a smallest common divisor of the set [16, 24]

Table 3 provides the delay spread and cell radius ranges associated with the old PRACH CP values, as was defined in 3GPP TS 36.211 v8.1.0, 2007-11. Table 4 gives a set of current values, as was defined in 3GPP TS 36.211 v8.2.0, 2008-03, in accordance with an embodiment of the invention. As can be observed, the associated delay spread and cell radius ranges remain very similar so that the CP dimensioning rules described earlier are retained.

TABLE 3

Old PRACH CP values (TS36.211 v8.1.0. 2007-11)

| Burst format | # allocated sub-frames | CP duration (μs/samples) | | GT duration (μs/samples) | | Delay Spread (μs) | Cell Radius (km) |
| --- | --- | --- | --- | --- | --- | --- | --- |
| | | μs | Syst spls ($N_{CP}$) | | | | |
| 0 | 1 | 102.60 | 3152 | 97.40 | 2992 | 5.21 | 14.61 |
| 1 | 2 | 683.98 | 21012 | 516.02 | 15852 | 16.67 | 77.40 |
| 2 | 2 | 202.60 | 6224 | 197.40 | 6064 | 5.21 | 29.61 |
| 3 | 3 | 683.98 | 21012 | 716.02 | 21996 | 16.67 | 100.10 |

TABLE 4

Improved PRACH CP values (TS36.211 v8.2.0, 2008-03)

| Burst format | # allocated sub-frames | IFFT size | IFFT sampling rate (MHz) | CP duration (μs/samples) | | | GT duration (μs/samples) | | Delay Spread (μs) | Cell Radius (km) |
|---|---|---|---|---|---|---|---|---|---|---|
| | | | | μs | IFFT spls | Syst spls ($N_{CP}$) | | | | |
| 0 | 1 | 1536 | 1.92 | 103.13 | 198 | 3168 | 96.88 | 2976 | 6.25 | 14.53 |
|   |   | 1024 | 1.28 |        | 132 |      |       |      |      |       |
| 1 | 2 | 1536 | 1.92 | 684.38 | 1314 | 21024 | 515.63 | 15840 | 16.67 | 77.34 |
|   |   | 1024 | 1.28 |        | 876 |      |       |      |      |       |
| 2 | 2 | 1536 | 1.92 | 203.13 | 390 | 6240 | 196.88 | 6048 | 6.25 | 29.53 |
|   |   | 1024 | 1.28 |        | 260 |      |       |      |      |       |
| 3 | 3 | 1536 | 1.92 | 684.38 | 1314 | 21024 | 715.63 | 21984 | 16.67 | 100.16 |
|   |   | 1024 | 1.28 |        | 876 |      |       |      |      |       |

As determined above, an improved CP duration corresponds to an integer number of samples, regardless the sampling rate resulting from the CP implementation choices at the UE transmitter. The improved CP duration allows a simple implementation for both design options at the UE transmitter. The resulting CP dimensioning rule is that its duration should be an integer multiple of both maximum sampling periods resulting from both design options.

As an example, in E-UTRA PRACH, having $N_{CP}$ divisible by 48 allow designers to choose from among various CP implementation options while avoiding the need for any interpolation block or any other mechanism to cope with CP durations defined as non-integer number of samples. The resulting improved CP durations and preamble durations are summarized in the Table 5.

TABLE 5

Random access burst parameters.

| Frame structure | Burst format | $T_{CP}$ | $T_{PRE}$ |
|---|---|---|---|
| Type 1 | 0 | 3168 × $T_s$ | 24576 × $T_s$ |
|        | 1 | 21024 × $T_s$ | 24576 × $T_s$ |
|        | 2 | 6240 × $T_s$ | 2 × 24576 × $T_s$ |
|        | 3 | 21024 × $T_s$ | 2 × 24576 × $T_s$ |
| Type 2 | 0 | 0 × $T_s$ | 4096 × $T_s$ |
|        | 1 | 0 × $T_s$ | 16384 × $T_s$ |
|        | 2 |   |   |

Figure 7A:
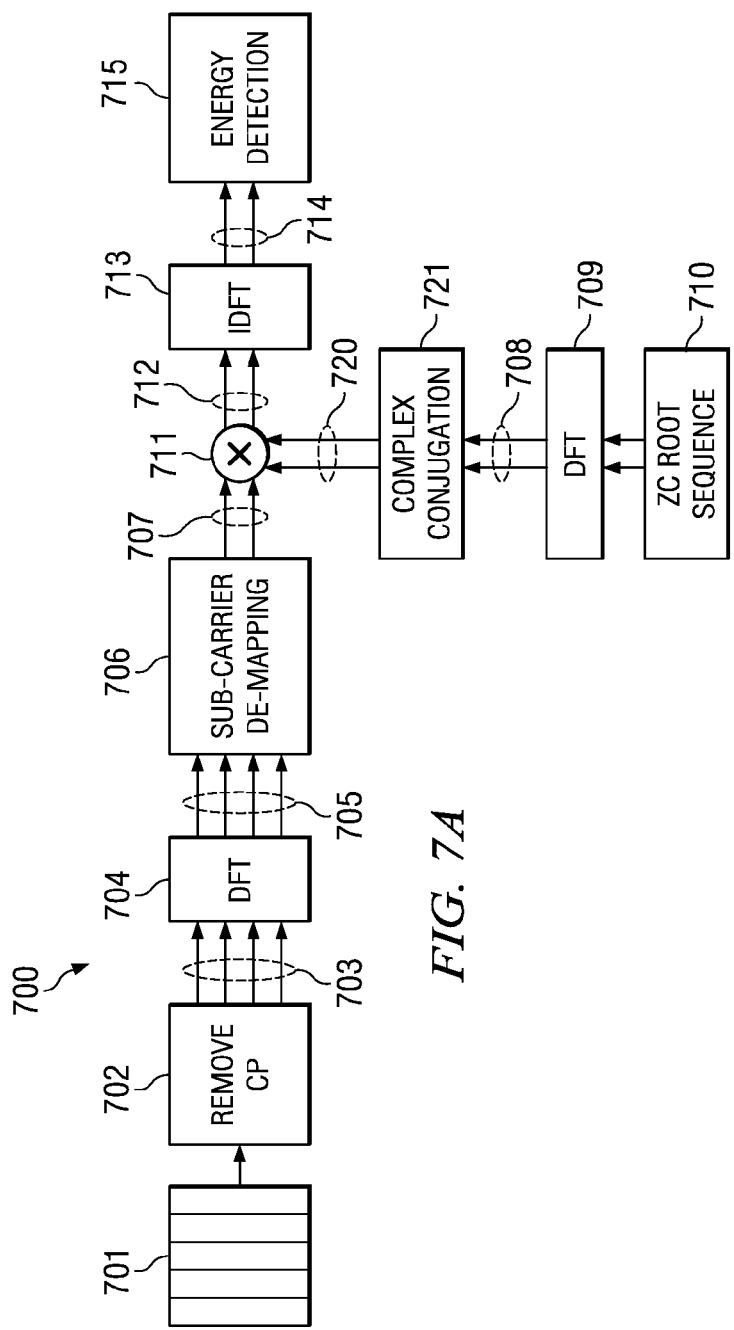
FIG. 7A is a block diagram of an illustrative receiver for receiving the preamble structure of FIG. 3.

FIG. 7A is a block diagram of an illustrative receiver for receiving the preamble structure of FIG. 3. This receiver advantageously makes use of the time and frequency domain transforming components used to map and de-map data blocks in the up-link sub-frame to take full profit of the PRACH format and CAZAC sequence by computing the PRACH power delay profile through a frequency-domain computed periodic correlation. Indeed, the power delay profile pdp(l) of the received sequence is defined as:

$$pdp_{yx}(l) = |r_{yx}(l)| = \left| \sum_{n=0}^{N_{ZC}-1} y(n)x^*((n+l)_{N_{ZC}}) \right| \quad (1)$$

where $r_{yx}(l)$ is the discrete periodic autocorrelation function at lag l of the received sequence y(n) and the reference searched CAZAC sequence x(n), and where ( )* and ( )$_n$ denote the complex conjugate and modulo-n respectively. Given the periodic convolution of the complex sequences y(n) and x(n) defined as:

$$[y(n) * x(n)](l) = \sum_{n=0}^{N_{ZC}-1} y(n)x((l-n)_{N_{ZC}}) \quad (2)$$

$r_{yx}(l)$ can be expressed as follows:

$$r_{yx}(l)=(y(n)*x^*(-n))(l) \quad (3)$$

Using the following properties of the Discrete Fourier Transform (DFT):

| Complex sequence | | DFT | |
|---|---|---|---|
| x(n) | → | X(k) | (4) |
| y(n) | → | Y(k) | |
| x*(−n) | → | X*(k) | |
| y(n) * x(n) | → | Y(k)X(k) | |

$r_{yx}(l)$ can be computed in frequency domain as:

$$r_{yx}=DFT^{-1}\{DFT(y(n))DFT(x(n))^*\} \quad (5)$$

Figure 7B:
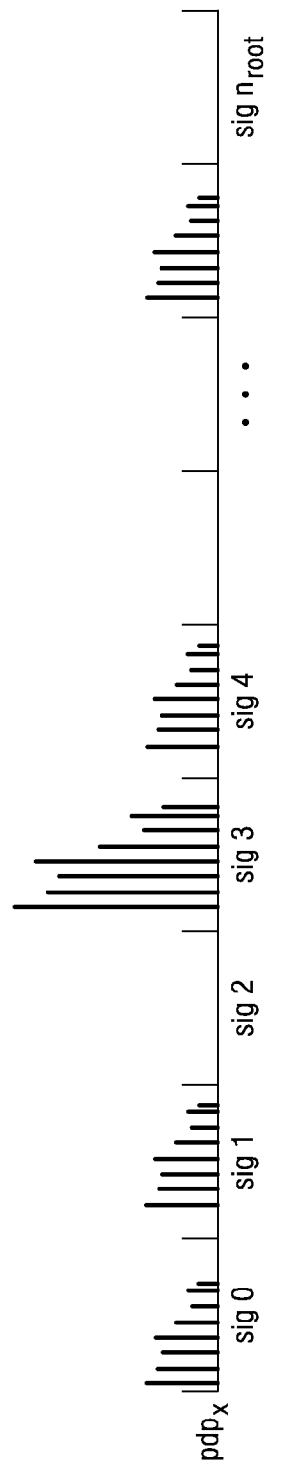
FIG. 7B is a plot of a power delay profile of an example root sequence received by the receiver of FIG. 7A.

An additional complexity reduction comes from the fact that different PRACH signatures are generated from cyclic shifts of a common root sequence. As illustrated in FIG. 7B, the frequency-domain computation of the power delay profile of a root sequence provides in one shot the concatenated power delay profiles of all signatures carried on the same root sequence.

The received PRACH signal 701, comprising cyclic prefix and PRACH preamble signal, is input to cyclic prefix removal component 702 which strips the cyclic prefix from the PRACH signal producing signal 703. As described above, the duration of the CP is selected to correspond to an integer number of samples, regardless the sampling rate resulting from the CP implementation choices at the UE transmitter. Furthermore, the eNB informs all UE within the cell to use a particular burst format, depending on the physical sized of the cell. The CP duration allows a simple implementation for both design options described herein at the UE transmitter. The resulting CP dimensioning rule is that its duration should be an integer multiple of both maximum sampling periods resulting from both design options. As an example, in E-UTRA PRACH, having $N_{CP}$ divisible by 48 allow designers choosing among various CP implementation options while avoiding the need for any interpolation block or any other mechanism to cope with CP durations defined as non-integer number of samples. The improved CP durations disclosed herein eliminates the need for any sort of up-sampling operation at the eNB to remove a partial symbol in the CP.

In one embodiment, frequency domain transforming component DFT 704 directly couples to cyclic prefix removal component 702. This reflects the full frequency domain with large DFT approach, similar to what is illustrated in FIG. 5 for the UE transmitter. Frequency domain transforming component 704 converts signal 703 into sub-carrier mapped frequency tones 705. Sub-carrier de-mapping component 706 is coupled to frequency domain transforming component 704. Sub-carrier de-mapping component 706 de-maps sub-carrier mapped frequency tones 705 to produce useful frequency tones 707. Product component 711 is coupled to both sub-carrier de-mapping component 707 and frequency domain transforming component 709. Frequency domain transforming component (DFT) 709 converts a preamble root sequence 710, such as a prime length Zadoff-Chu sequence, into a corresponding set of pilot frequency tones 708. Complex conjugation of pilot frequency tones 708 is performed using 721, to produce samples 720. Product component 711 computes a tone by tone complex multiplication of received frequency tones 707 with samples 720 to produce a set of frequency tones 712. Time domain transforming component (IDFT) 713 is coupled to product component 711. Time domain transforming component 713 converts multiplied frequency tones 712 into correlated time signal 714. Correlated time signal 714 contains concatenated power delay profiles of the cyclic shift replicas of the preamble root sequence 710. Energy detection block 715 is coupled to time domain transforming block 713. Energy detection block 715 identifies received preamble sequences by detecting the time of peak correlation between received schedule request signal 701 and preamble root sequence 710.

Note that frequency domain transforming component 709 is called for when using transmitters that perform a DFT operation. When using an embodiment of a transmitter that does not perform a DFT, such as illustrated in FIGS. 5 and 6, frequency domain transforming component 709 may be omitted.

Figure 7C:
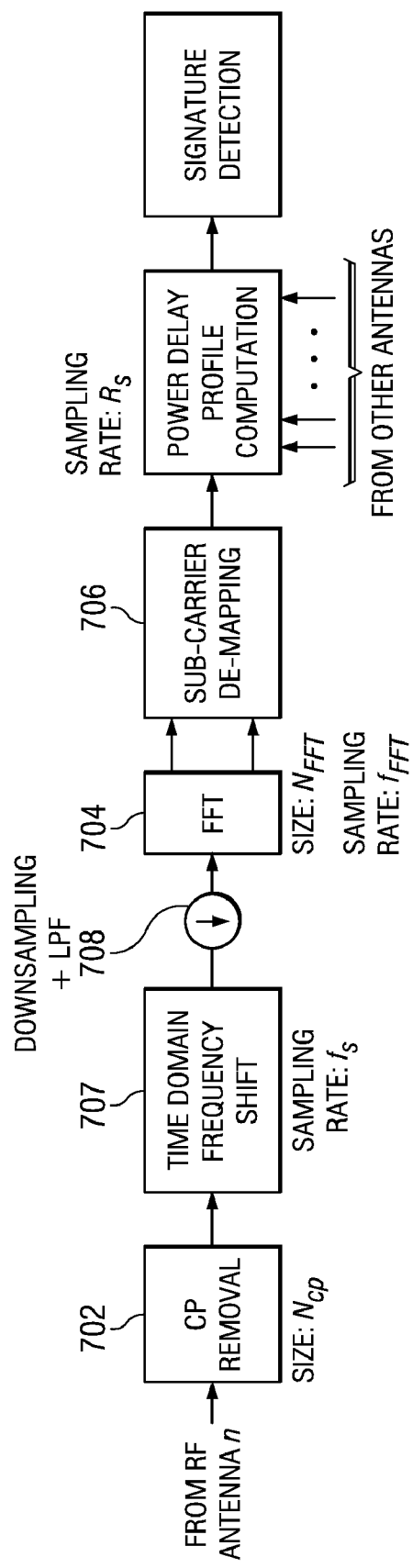
FIG. 7C is a block diagram of another embodiment of an illustrative receiver for receiving the preamble structure of FIG. 3.

FIG. 7C illustrates another embodiment where a hybrid time/frequency domain receiver is implemented. The difference with FIG. 7A is that cyclic prefix removal component 702 is now followed by a time-domain frequency shift component 707 and a down-sampling/low-pass filter component 708. Both 707 and 708 aim at frequency converting and down-sampling in time domain the PRACH signal from its frequency allocation $N_{PRB}^{RA}$ to zero center frequency. Then, the signal is transformed to frequency domain through FFT 704, which size is smaller than the DFT 704 of FIG. 7A. The following components (706, ...) are the same as those of FIG. 7A.

Figure 8:
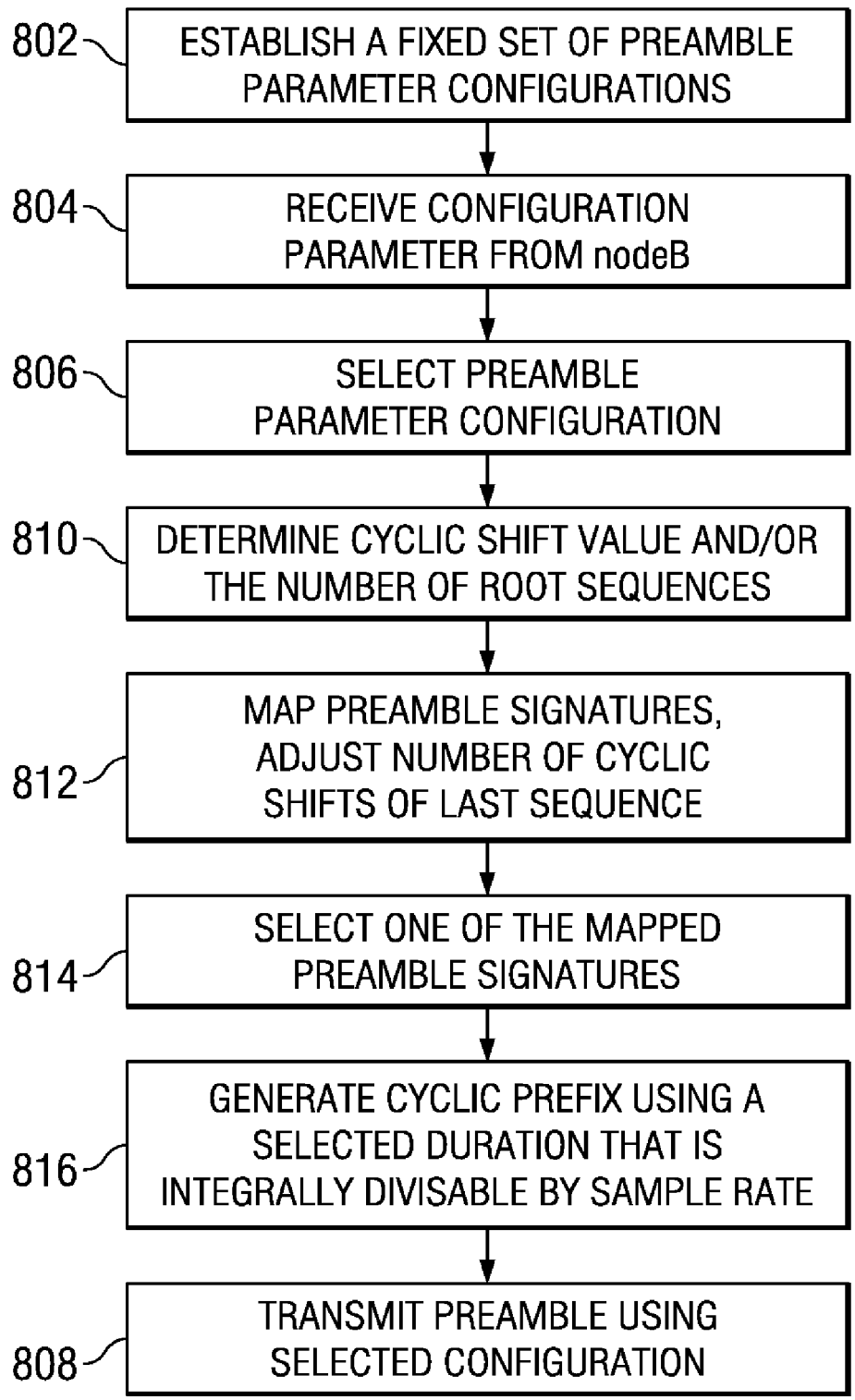
FIG. 8 is a flow diagram illustrating generation of preamble burst for transmission of the preamble structure of FIG. 3.

FIG. 8 is a flow diagram illustrating the operation generating a preamble burst for transmission of the PRACH preamble structure of FIG. 3 from user equipment to base stations. The fixed set of preamble parameter configurations for use across a complete range of cell sizes within the cellular network is established 802 as discussed above. Once established, each UE that will operate in the network is preloaded with the fixed set of preamble configurations. In the present embodiment, this is done by loading the fixed set of preamble configurations into a storage circuit, such as a flash read only memory (EPROM) or other type of random access memory device, in an offline procedure. In another embodiment, the storage circuit may by loaded or updated via data downloads from a eNB or other control system within the network using over the air transmissions. The fixed set of preamble parameter configurations may be stored on the UE in the form of a record or table that can be accessed using the configuration number as an index, for example.

In addition to the fixed set of parameter configurations that is preloaded onto all UEs in the cellular network, the ordering of root sequences and the rule for physical mapping of the signatures onto the root sequences is preloaded onto all UEs that will operate within the network.

As a UE enters a cell, an eNB serving that cell broadcasts control signaling information to the UE to notify the UE as to what preamble configuration to use within that cell. The eNB also broadcasts the index of the first root sequence of the set of preloaded root sequences and information of whether high speed cyclic shift restrictions apply within the cell. The UE receives 804 a configuration parameter from the eNB that is correlated to the size of the cell and indicates which frame structure and burst format to use for PRACH bursts, as described in Table 5 for this embodiment. For example, if the cell size is small, up to about 14 km, burst format 0 might be selected by the eNB. Similarly, if the cell size is large, burst format 3 may be selected by the eNB.

After receiving the control signaling information, the UE will store this information for future reference. When it is time to transmit a PRACH preamble, the UE selects a preamble parameter configuration specified by a received configuration number from the fixed set of preamble parameter configurations. The configuration includes duration of the preamble and duration of the cyclic prefix.

The UE will then transmit 808 a RA preamble to the eNB using the preamble parameter configuration indicated by the configuration number.

Before transmitting the preamble, the UE determines 810 the cyclic shift value and/or the number of root sequences of the selected preamble parameter configuration by consulting the stored fixed set of preamble parameter configurations using the received configuration number as an index in this embodiment. Other embodiments may use other schemes to associate the received configuration number with a corresponding preamble configuration of the fixed set of preamble parameter configurations that is stored on the UE.

In this embodiment there are sixty-four preamble signatures that may be used by any UE within a given cell. The UE maps 812 the sixty-four preamble signatures to subsequent cyclic shifts of a given root sequence according to the number of cyclic shifts until the given root sequence is full. Generally one root sequence will not accommodate all sixty-four signatures and mapping continues to additional root sequences for all of the number of root sequences until a last root sequence. If the last sequence has a different number of cyclic shifts as indicated by the selected parameter configuration, then the UE may adjust 812 the number of cyclic shifts mapped onto the last root sequence such that the predetermined number (64) of preamble signatures are mapped.

After mapping the preamble signatures, the UE selects 814 one of the mapped preamble signatures for use in transmitting 808 the preamble. There are sixty-four total possible signatures. This set is split as follows: 1) contention-based signatures/contention-free signatures; 2) the contention-based signature set is split into two sub-sets: small/large resource allocation of msg3.

Contention-free signatures are explicitly allocated to a UE by the eNB in the case of handover and new downlink data in buffer for a non-synchronized UE.

Contention-based signatures are selected by the UE as follows. First, the UE chooses the relevant subset based on the size of the UL resource it needs to send as a variable size message (msg3) on the physical uplink shared channel (PUSCH) after the preamble. The UE estimates the size of the UL resource based on msg3 payload and quality of the radio link; the poorer the radio link quality, the smaller the allocated bandwidth. Then, the UE picks a signature randomly within the selected signature subset. As discussed in detail with respect to FIGS. 5 and 6, the various embodiments may use different sample rates to form the preamble.

Depending on the specified burst format from Table 5, a cyclic prefix is generated 816 that has a specified duration that is integrally divisible by each of the plurality of different sample rates.

Regardless of whether the request is contention-based or contention-free, in this embodiment the transmission will use the same physical random access channel (PRACH) and preamble structure, as described herein. Of course, in other embodiments the contention-free transmissions may be transmitted using a variation of this scheme or a different scheme.

System Examples

Figure 9:
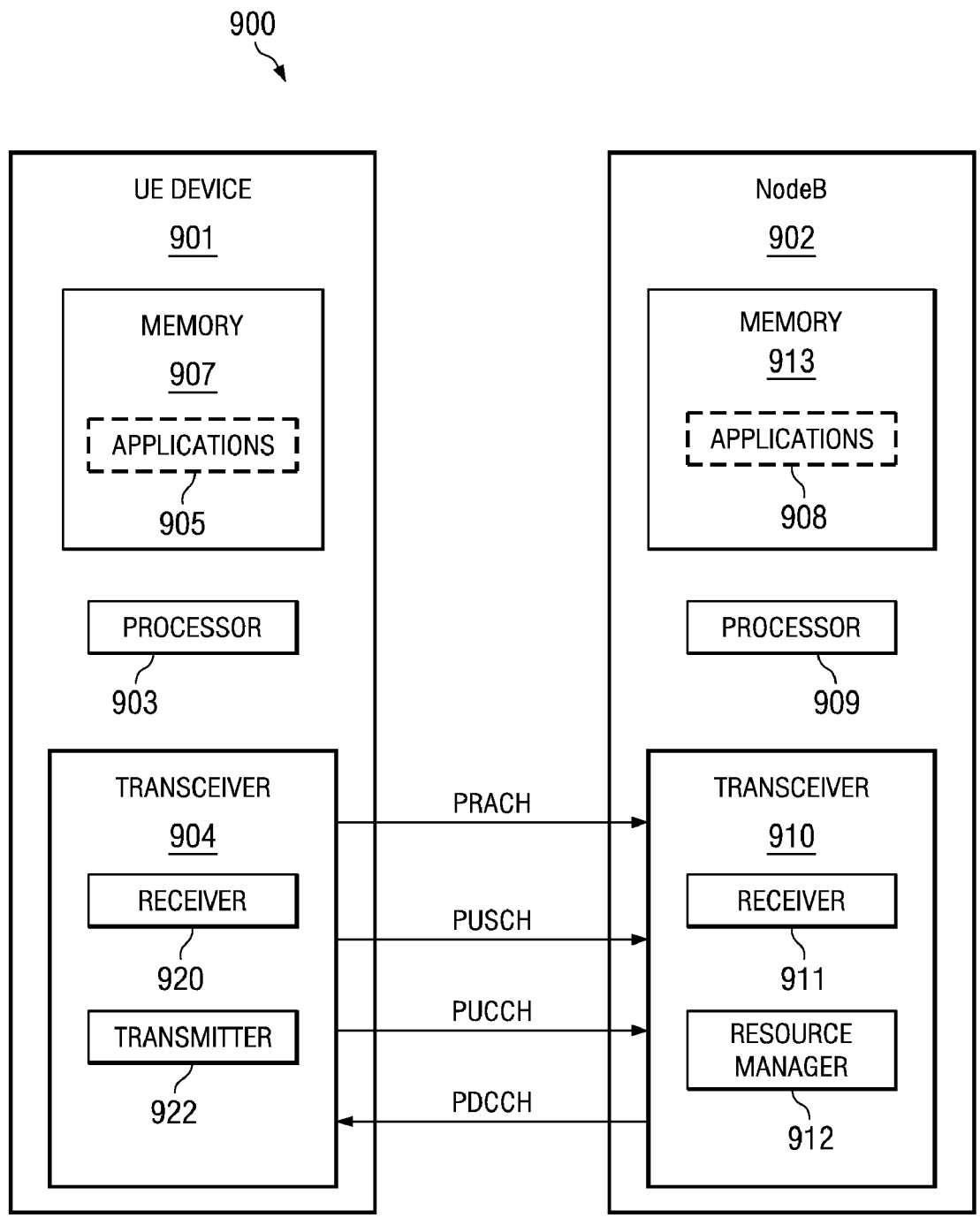
FIG. 9 is a block diagram illustrating the network system of FIG. 1.

FIG. 9 is a block diagram illustrating the network system of FIG. 1. As shown in FIG. 9, the wireless networking system 900 comprises a mobile UE device 901 in communication with an eNB 902. The mobile UE device 901 may represent any of a variety of devices such as a server, a desktop computer, a laptop computer, a cellular phone, a Personal Digital Assistant (PDA), a smart phone or other electronic devices. In some embodiments, the electronic mobile UE device 901 communicates with the eNB 902 based on a LTE or E-UTRAN protocol. Alternatively, another communication protocol now known or later developed can be used.

As shown, the mobile UE device 901 comprises a processor 903 coupled to a memory 907 and a Transceiver 904. The memory 907 stores (software) applications 905 for execution by the processor 903. The applications 905 could comprise any known or future application useful for individuals or organizations. As an example, such applications 905 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 905, at least some of the applications 905 may direct the mobile UE device 901 to transmit UL signals to the eNB (base-station) 902 periodically or continuously via the transceiver 904.

Transceiver 904 includes uplink logic which may be implemented by execution of instructions that control the operation of the transceiver. Some of these instructions may be stored in memory 907 and executed when needed. As would be understood by one of skill in the art, the components of the Uplink Logic may involve the physical (PHY) layer and/or the Media Access Control (MAC) layer of the transceiver 904. Transceiver 904 includes one or more receivers 920 and one or more transmitters 922. The transmitter(s) may be embodied as described with respect to FIG. 5 or 6. In particular, as described above, in more detail, a pre-defined set of sequences is defined. An ordered group of sequences that is a proper subset of the pre-defined set of sequences is used within a particular cell. Upon entering the cell, a UE receives an indication of a logical index for a first sequence from eNB 902 via receiver 920, wherein the first sequence belongs to the ordered group of sequences and an indication of an auxiliary parameter that further describes the amount of cyclic shift to use.

Transmitter module 922 produces a preamble sequence using the received indication of the logical index of the first sequence and using the auxiliary parameter, by selecting the second sequence from the ordered group of sequences. Transmitter module 922 produces a transmission signal by modulating the second sequence to form a PRACH preamble, as described in more detail above with respect to FIGS. 5 and 6. A cyclic prefix is formed having a duration $N_{CP}$ selected to be integrally divisible by each of a plurality of different sample periods that may be used by various apparatus within the system. In this embodiment, duration $N_{CP}$ is selected to be integrally divisible by 48 which allows various CP implementation options while avoiding the need for any interpolation block or any other mechanism to cope with CP durations defined as non-integer number of samples. The CP durations and preamble durations for this embodiment are summarized in Table 5. The PRACH signal is then sent to eNB 902 on the PRACH channel, as indicated. It should be noted that in other embodiments in which different sample rates are used, the specified duration is selected to be integrally divisible by each of a plurality of different sample periods that may be used by various apparatus within the system. In those embodiments, the selected sample duration may be selected to be integrally divisible by a smallest common divisor which would likely be different from 48.

The eNB 902 comprises a Processor 909 coupled to a memory 913 and a transceiver 910. Memory 913 stores applications 908 for execution by the processor 909. The applications 908 could comprise any known or future application useful for managing wireless communications. At least some of the applications 908 may direct the base-station to manage transmissions to or from the user device 901.

Transceiver 910 comprises an uplink Resource Manager 912, which enables the eNB 902 to selectively allocate uplink PUSCH resources to the user device 901. As would be understood by one of skill in the art, the components of the uplink resource manager 912 may involve the physical (PHY) layer and/or the Media Access Control (MAC) layer of the transceiver 910. Transceiver 910 includes a Receiver 911 for receiving transmissions from various UE within range of the eNB.

Uplink resource manager 912 executes instructions that control the operation of transceiver 910. Some of these instructions may be located in memory 913 and executed when needed. Resource manager 912 controls the transmission resources allocated to each UE that is being served by eNB 902 and broadcasts control information via the physical downlink control channel PDCCH. In particular, eNB 902 selects a second sequence to be assigned to UE 901 within a cell served by eNB 902 from the pre-defined set of sequences. As was described in more detail above, the second sequence is selected from an ordered group of sequences, containing at least a first sequence that is a proper subset of the pre-defined set of sequences. Transceiver 910 transmits an indication of a logical index for the first sequence to UE 901 along with an indication of an auxiliary parameter; the auxiliary parameter and the indication of the logical index of the first sequence together identify a logical index of the second sequence. Transceiver 910 also transmits control information to select a particular burst format for the PRACH frame structure.

At some later point in time, eNB 902 receives a PRACH preamble transmission signal from the UE containing a modulated second sequence via receiver 911, which is constructed as described with respect to FIG. 7A or 7C. The PRACH preamble transmission is decoded as described with respect to FIG. 7A/7C. As discussed above, the CP duration $N_{CP}$ is divisible by 48 to allow UE having various CP implementation options to operate within the cell while avoiding the need for any interpolation block or any other mechanism to cope with CP durations defined as non-integer number of samples. The CP durations and preamble durations for this embodiment are summarized in Table 5.

Figure 10:
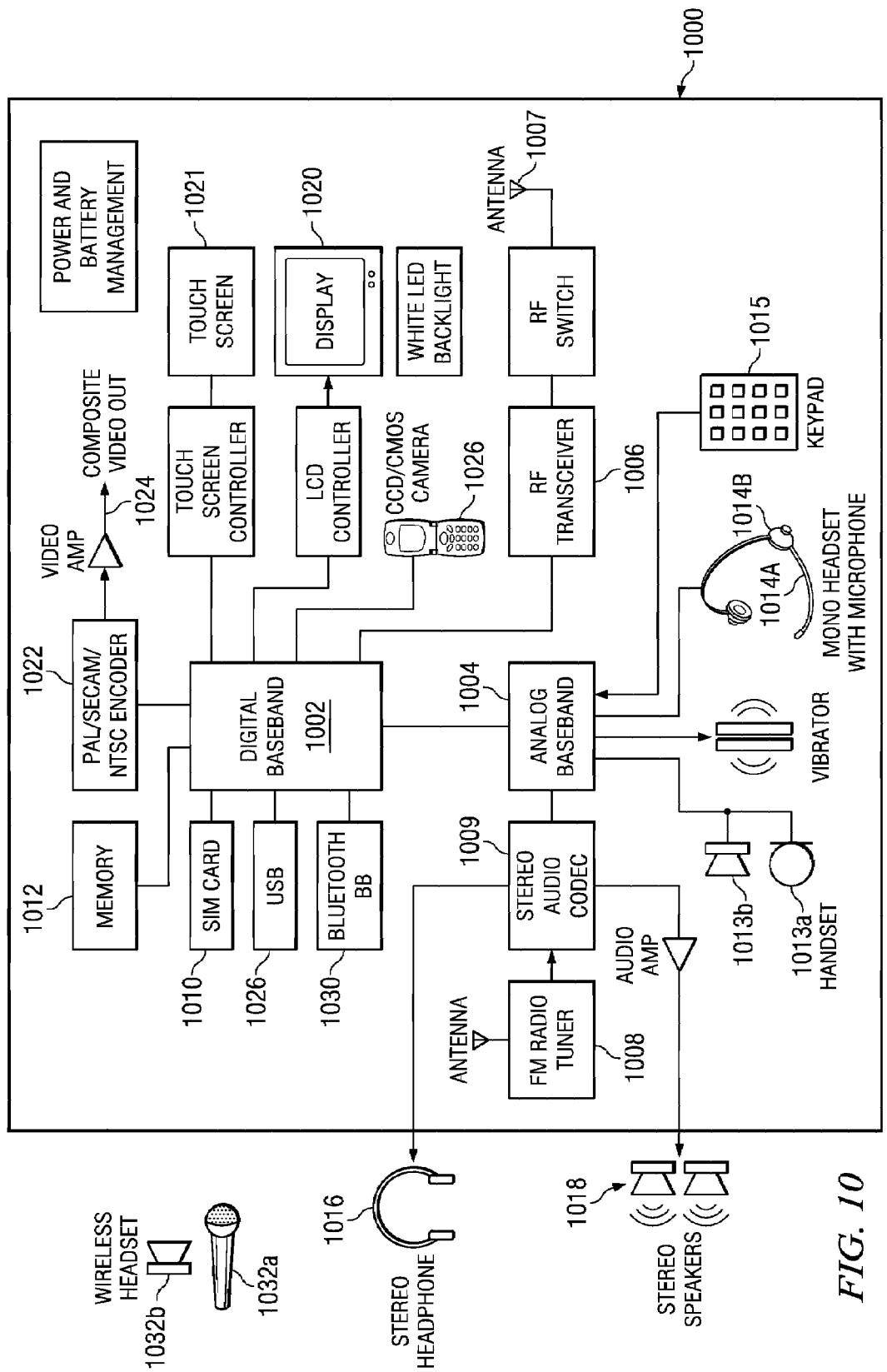
FIG. 10 is a block diagram of a cellular phone for use in the network of FIG. 1.

FIG. 10 is a block diagram of a UE 1000 that stores a fixed set of preamble parameter configurations for use across a complete range of cell sizes within the cellular network, as described above. Digital system 1000 is a representative cell phone that is used by a mobile user. Digital baseband (DBB) unit 1002 is a digital processing processor system that includes embedded memory and security features.

Analog baseband (ABB) unit 1004 performs processing on audio data received from stereo audio codec (coder/decoder) 1009. Audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc. ABB 1004 receives a voice data stream from handset microphone 1013*a* and sends a voice data stream to handset mono speaker 1013*b*. ABB 1004 also receives a voice data stream from microphone 1014*a* and sends a voice data stream to mono headset 1014*b*. Usually, ABB and DBB are separate ICs. In most embodiments, ABB does not embed a programmable processor core, but performs processing based on configuration of audio paths, filters, gains, etc being setup by software running on the DBB. In an alternate embodiment, ABB processing is performed on the same processor that performs DBB processing. In another embodiment, a separate DSP or other type of processor performs ABB processing.

RF transceiver 1006 includes a receiver for receiving a stream of coded data frames and commands from a cellular base station via antenna 1007 and a transmitter for transmitting a stream of coded data frames to the cellular base station via antenna 1007. A transmitter for a PRACH signal transmission may be embodied as described above in more detail with reference to FIG. 5 or 6. A command received from the base station indicates what configuration number of the fixed set of preamble parameter configurations is to be used in a given cell, as described in more detail above. A CP is formed with a cyclic prefix having a duration $N_{CP}$ divisible by 48 which allows various CP implementation options while avoiding the need for any interpolation block or any other mechanism to cope with CP durations defined as non-integer number of samples. The CP durations and preamble durations for this embodiment are summarized in Table 5. The PRACH signal is then sent to an eNB on the PRACH channel via antenna 1007. It should be noted that in other embodiments in which different sample rates are used, the specified duration is selected to be integrally divisible by each of a plurality of different sample periods that may be used by various apparatus within the system. In those embodiments, the selected sample duration may be selected to be integrally divisible by a smallest common divisor which would likely be different from 48.

A non-synchronous PRACH signal is transmitted using a selected preamble structure based on cell size when data is ready for transmission as described above. In particular, the PRACH preamble is transmitted by modulating a sequence that is produced by using a received indication of a logical index of a first sequence and using an auxiliary parameter, wherein the sequence is selected from an ordered group of sequences. In response, scheduling commands are received from the serving base station. Among the scheduling commands can be a command (implicit or explicit) to use a particular sub-channel for transmission that has been selected by the serving NodeB. Transmission of the scheduled resource blocks are performed by the transceiver using the sub-channel designated by the serving NodeB. Frequency hopping may be implied by using two or more sub-channels as commanded by the serving NodeB. In this embodiment, a single transceiver supports OFDMA and SC-FDMA operation but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by cell phone 1000.

The basic SC-FDMA DSP radio can include DFT, subcarrier mapping, and IFFT (fast implementation of IDFT) to form a data stream for transmission and DFT, subcarrier de-mapping and IFFT to recover a data stream from a received signal. DFT, IFFT and subcarrier mapping/de-mapping may be performed by instructions stored in memory 1012 and executed by DBB 1002 in response to signals received by transceiver 1006.

DBB unit 1002 may send or receive data to various devices connected to USB (universal serial bus) port 1026. DBB 1002 is connected to SIM (subscriber identity module) card 1010 and stores and retrieves information used for making calls via the cellular system. DBB 1002 is also connected to memory 1012 that augments the onboard memory and is used for various processing needs. DBB 1002 is connected to Bluetooth baseband unit 1030 for wireless connection to a microphone 1032*a* and headset 1032*b* for sending and receiving voice data.

DBB 1002 is also connected to display 1020 and sends information to it for interaction with a user of cell phone 1000 during a call process. Display 1020 may also display pictures received from the cellular network, from a local camera 1026, or from other sources such as USB 1026.

DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder 1022 provides encoding according to PAL/SECAM/NTSC video standards.

Other Embodiments

While the invention has been described with reference to illustrative embodiments, this description is not intended to be construed in a limiting sense. Various other embodiments of the invention will be apparent to persons skilled in the art upon reference to this description.

Embodiments of this invention apply to any flavor of frequency division multiplex based transmission. Thus, the concept of valid specification of sub-channels can easily be applied to: OFDMA, OFDM, DFT-spread OFDM, DFT-spread OFDMA, SC-OFDM, SC-OFDMA, MC-CDMA, and all other FDM-based transmission strategies.

A NodeB is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

In a general embodiment of the present disclosure, the set of allowed PRACH preamble signals is defined by two other sets: 1) a set of allowed root CAZAC sequences, and 2) a set of allowed modifications to a given root CAZAC sequence. In one embodiment, PRACH preamble signal is constructed from a CAZAC sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and others. Thus, in various embodiments of the present disclosure, a UE constructs a PRACH preamble signal by selecting a CAZAC sequence, possibly applying a combination of the described modifications to the selected CAZAC sequence, modulating the modified sequence, and transmitting the resulting PRACH signal over the air. The cyclic prefix is formed by selecting a portion of the resulting preamble signal having a duration that is an integer multiple of various sample rates that may be used to form the preamble sequence.

The embodiments described herein focus on the PRACH preamble CP, but could apply to any other OFDM symbol or OFDM-like symbols where it is seen convenient to implement the time-frequency hybrid approach. Such symbols may be the case of LTE-A, (LTE Advanced) which might similarly involve very large FFTs and which is currently being standardized in 3GPP groups.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method for transmitting in a wireless network, comprising:
   generating an OFDM symbol along with its cyclic prefix (CP) at a selected sample period, such that both the OFDM symbol and the CP span specified duration periods $T_{SYM}$ and $T_{CP}$ respectively, wherein the selected sample period is one of a plurality of different sample periods; and
   wherein the plurality of said sample periods enables both full frequency domain and hybrid time-frequency domain generation of both the OFDM symbol and the CP; and
   wherein both the specified duration periods $T_{SYM}$ and $T_{CP}$ are integrally divisible by each of the plurality of different sample periods.

2. The method of claim 1, wherein the OFDM symbol comprises a cyclic prefix formed using the selected sample period; and further comprising transmitting a preamble sequence with the cyclic prefix appended thereto.

3. The method of claim 2, wherein the preamble sequence with the appended cyclic prefix is transmitted on a physical random access channel.

4. The method of claim 2, wherein the specified duration period expressed in number of samples obtained with the smaller sample period $T_S$ of the plurality of sample periods is integrally divisible by 48.

5. The method of claim 2, further comprising selecting the specified duration period from a plurality of specified duration periods, wherein each one of the plurality of specified duration periods is integrally divisible by each of the plurality of different sample periods.

6. The method of claim 5, wherein each one of the plurality of specified duration periods expressed in number of samples obtained with the smaller sample period T.sub.S of the plurality of sample periods is integrally divisible by 48.

7. The method of claim 6, wherein one of the plurality of specified duration periods is equal to 21024 times the system sampling period $T_S$.

8. The method of claim 6, wherein the plurality of specified duration periods comprise 3168 times the system sampling period ($T_S$), 21024×($T_S$), 6240×($T_S$), and 21024×($T_S$).

9. A method for transmitting from user equipment (UE) to base stations (nodeB) in a cellular network, comprising:
   establishing a fixed set of preamble parameter configurations for use across a complete range of cell sizes within the cellular network;
   receiving at a UE located in a cell a configuration ID transmitted from a nodeB serving the cell, the configuration ID being indicative of a size of the cell;
   selecting a preamble parameter configuration specified by the received configuration ID from the fixed set of preamble parameter configurations, wherein the preamble parameter configuration specifies a selected duration period for a cyclic prefix that is integrally divisible by each of a plurality of different sample periods; wherein the plurality of said sample periods enables both full frequency domain and hybrid time-frequency domain generation of the preamble and its cyclic prefix; wherein the smaller sample period $T_S$ of the plurality of sample periods is the system sampling period;
   generating a preamble sequence and a cyclic prefix using the preamble parameter configuration indicated by the configuration ID and using one of the plurality of different sample periods; and
   transmitting the preamble and cyclic prefix from the UE to the nodeB.

10. The method of claim 9, wherein each preamble parameter configuration of the set of preamble parameter configurations implicitly defines a number of root sequences, a number of cyclic shifts per root sequence, and a specified duration period for the cyclic prefix.

11. The method of claim 9, wherein the specified duration period expressed in number of samples obtained with the smaller sample period $T_S$ of the plurality of sample periods is integrally divisible by 48.

12. The method of claim 9, further comprising selecting the specified duration period from a plurality of specified duration periods comprising 3168 times the system sampling period ($T_S$), 21024×($T_S$), 6240×($T_S$), and 21024×($T_S$).

13. A method for transmitting in a wireless network, comprising:
   receiving a random access request burst on a physical random access channel comprising a preamble and an appended cyclic prefix;
   removing the cyclic prefix, wherein the cyclic prefix has a specified duration period that is integrally divisible by each of a plurality of different sample periods; wherein the smaller sample period $T_S$ of the plurality of sample periods is the system sampling period; and
   detecting the remaining preamble.

14. The method of claim 13, further comprising broadcasting an indication of a selected frame structure configuration to be used by transmitters for producing the random access burst, wherein the selected frame structure configuration specifies the duration period of the cyclic prefix and a duration period of the preamble.

15. The method of claim 14, wherein the frame structure configuration is selected from a plurality of frame structure configurations comprising cyclic prefix durations of 3168 times the system sampling period ($T_S$), 21024×($T_S$), 6240×($T_S$), and 21024×($T_S$), respectively.

16. A user apparatus (UE) for use in a cellular wireless network, comprising:
   a receiver connected to an antenna operable to receive information within a given cell that designates a particular configuration ID of a fixed set of preamble parameter configurations for use across a complete range of cell sizes within the cellular network;
   a processor connected to a storage memory holding instructions for execution by the processor and for holding the fixed set of preamble parameter configurations and connected to obtain signals from the receiver, wherein the processor is operable to select a preamble parameter configuration specified by the received configuration ID from the fixed set of preamble parameter configurations, wherein the preamble parameter configuration specifies a selected duration period for a cyclic prefix that is integrally divisible by each of a plurality of different sample periods; wherein the plurality of said sample periods enables both full frequency domain and hybrid time-frequency domain generation of the preamble and its cyclic prefix; wherein the smaller sample period $T_S$ of the plurality of sample periods is the system sampling period;

a transmitter coupled to the storage memory operable to generate a random access burst having a preamble sequence and a cyclic prefix having a selected duration period using the preamble parameter configuration indicated by the configuration ID and using one of the plurality of different sample periods; and the transmitter being operable to transmit the generated random access burst from the cellular telephone to the NodeB.

17. The user apparatus of claim 16, wherein the specified duration period expressed in number of system sampling periods $T_S$ is integrally divisible by 48.

18. The user apparatus of claim 16, further comprising selecting the specified duration period from a plurality of specified duration periods comprising 3168 times the system sampling period $(T_S)$, 21024×$(T_S)$, 6240×$(T_S)$, and 21024×$(T_S)$.

19. The user apparatus of claim 16, the user apparatus being a cell phone.

* * * * *